(12) United States Patent
Betz

(10) Patent No.: US 11,833,961 B2
(45) Date of Patent: Dec. 5, 2023

(54) METHOD FOR CONTROLLING A LIGHTING SYSTEM SO THAT A LIGHT FOLLOWS MOVEMENT OF A HAND

(71) Applicant: DAIMLER AG, Stuttgart (DE)

(72) Inventor: Daniel Betz, Rottenburg-Seebronn (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 199 days.

(21) Appl. No.: 17/604,062

(22) PCT Filed: Mar. 19, 2020

(86) PCT No.: PCT/EP2020/057542
§ 371 (c)(1),
(2) Date: Oct. 15, 2021

(87) PCT Pub. No.: WO2020/212063
PCT Pub. Date: Oct. 22, 2020

(65) Prior Publication Data
US 2022/0219603 A1    Jul. 14, 2022

(30) Foreign Application Priority Data

Apr. 16, 2019 (DE) .................... 10 2019 002 794.9

(51) Int. Cl.
*B60Q 3/76* (2017.01)
*B60Q 3/85* (2017.01)
(Continued)

(52) U.S. Cl.
CPC ............... *B60Q 3/76* (2017.02); *B60Q 3/85* (2017.02); *G06F 3/017* (2013.01); *H05B 45/20* (2020.01);
(Continued)

(58) Field of Classification Search
CPC .. B60Q 3/76; B60Q 3/85; G06F 3/017; H05B 45/20; H05B 47/125; H05B 47/155
See application file for complete search history.

(56) References Cited

U.S. PATENT DOCUMENTS

| | | |
|---|---|---|
| 7,221,271 B2 | 5/2007 | Reime |
| 9,744,853 B2 | 8/2017 | Mere et al. |

(Continued)

FOREIGN PATENT DOCUMENTS

| | | | | |
|---|---|---|---|---|
| CN | 108093504 A | * | 5/2018 | ............. H05B 45/10 |
| CN | 108124358 A | * | 6/2018 | ........... H05B 47/105 |

(Continued)

OTHER PUBLICATIONS

Eichhorn et al., DE102017212062, Jan. 2019, machine translation (Year: 2019).*

(Continued)

*Primary Examiner* — Tracie Y Green
(74) *Attorney, Agent, or Firm* — PATENT PORTFOLIO BUILDERS PLLC

(57) ABSTRACT

A method for controlling a lighting system in an interior chamber of a vehicle having controllable light sources that generate at least one reading light with a defined light cone and a light spot is provided. A gesture camera recognizes gestures of a person located in the interior chamber and the lighting system is controlled by the recognized gestures. A light controller is active between a starting point in time and an end point in time. When the light controller is active and in the event of a gripping or pointing gesture of a hand in the region of the light cone or light spot, the light cone or light spot is guided along with the hand carrying out the gesture.

7 Claims, 2 Drawing Sheets

Figure 4:
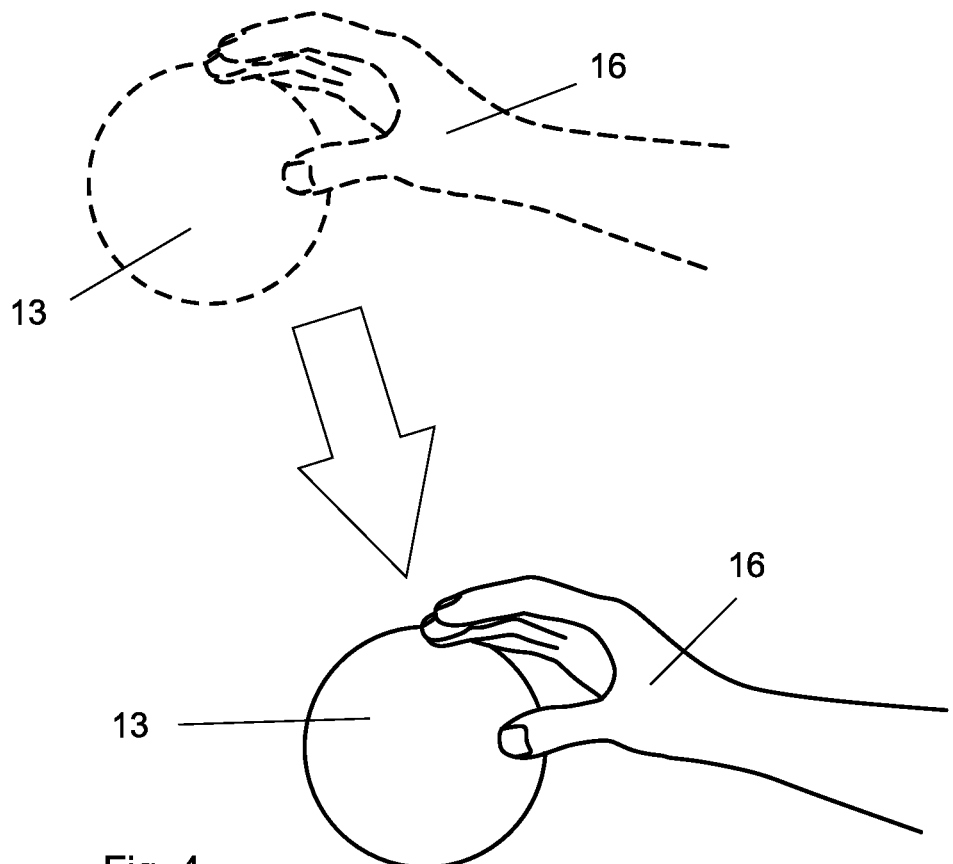

(51) Int. Cl.
  *H05B 45/20*  (2020.01)
  *H05B 47/125* (2020.01)
  *H05B 47/155* (2020.01)
  *G06F 3/01*   (2006.01)
(52) U.S. Cl.
  CPC ......... *H05B 47/125* (2020.01); *H05B 47/155* (2020.01)

(56) References Cited

U.S. PATENT DOCUMENTS

| | | | |
|---|---|---|---|
| 10,375,797 B2 | 8/2019 | Heinrich | |
| 2004/0189720 A1* | 9/2004 | Wilson | G06F 3/017 715/863 |
| 2014/0223384 A1* | 8/2014 | Graumann | B60W 50/08 715/863 |
| 2015/0298605 A1* | 10/2015 | Salter | B60Q 3/76 315/77 |
| 2016/0183350 A1* | 6/2016 | Van De Sluis | H05B 45/20 315/308 |
| 2017/0270924 A1* | 9/2017 | Fleurence | G10L 15/22 |

FOREIGN PATENT DOCUMENTS

| | | |
|---|---|---|
| DE | 102012017276 A1 | 3/2014 |
| DE | 102013200512 A1 | 7/2014 |
| DE | 102013223145 A1 | 5/2015 |
| DE | 102014011095 A1 | 1/2016 |
| DE | 102015122489 A1 | 6/2016 |
| DE | 102015011891 A1 * | 1/2017 |
| DE | 102015010421 A1 | 2/2017 |
| DE | 102016005062 A1 | 11/2017 |
| DE | 102017212061 A1 | 1/2019 |
| DE | 102017212062 A1 | 1/2019 |
| DE | 102018205664 A1 | 10/2019 |
| EP | 2977264 A2 | 1/2016 |
| FR | 3056494 A1 | 3/2018 |
| WO | 2004039631 A1 | 5/2004 |
| WO | 2014060874 A1 | 4/2014 |

OTHER PUBLICATIONS

Betz et al., DE102015011891A1, machine translation, Jan. 2017 (Year: 2017).*
Dong et al., CN 108124358 A, machine translation Jun. 2018 (Year: 2018).*
International Search Report dated May 19, 2020 in related/corresponding International Application No. PCT/EP2020/057542.
Office Action dated Jan. 9, 2020 in related/corresponding DE Application No. 10 2019 002 794.9.
Written Opinion dated May 19, 2020 in related/corresponding International Application No. PCT/EP2020/057542.

* cited by examiner

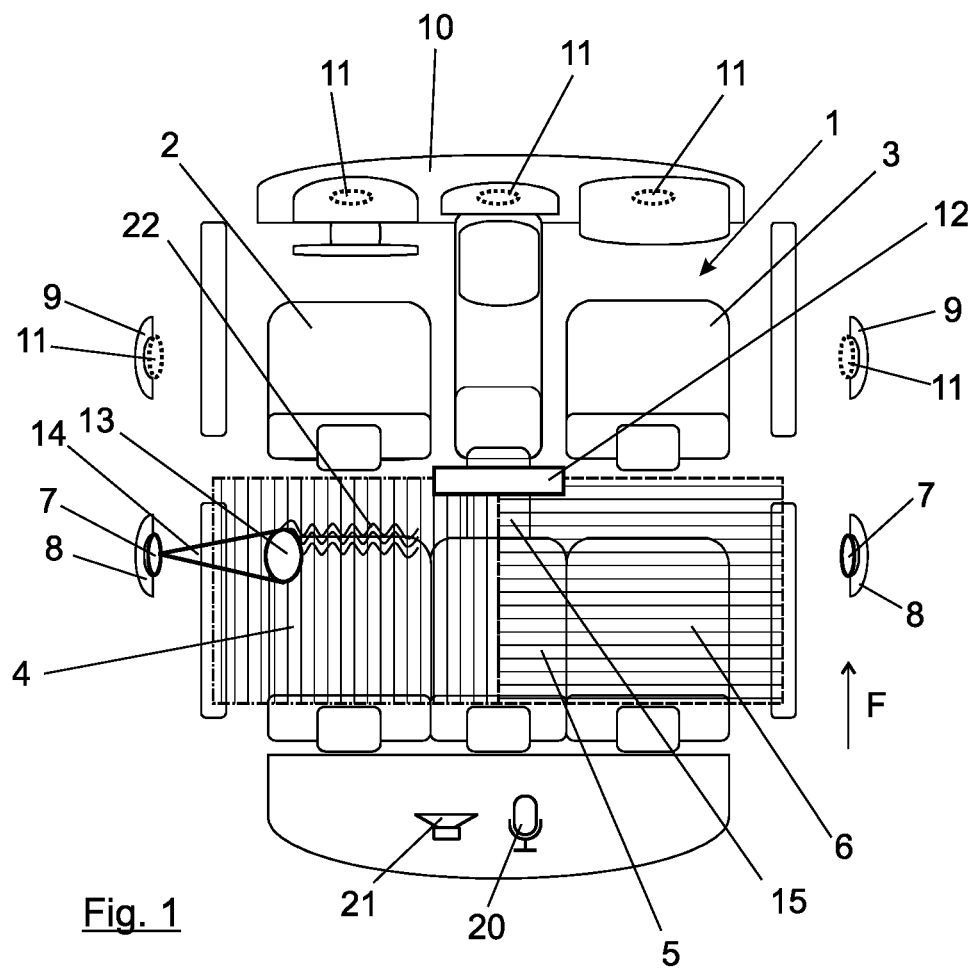
Fig. 1
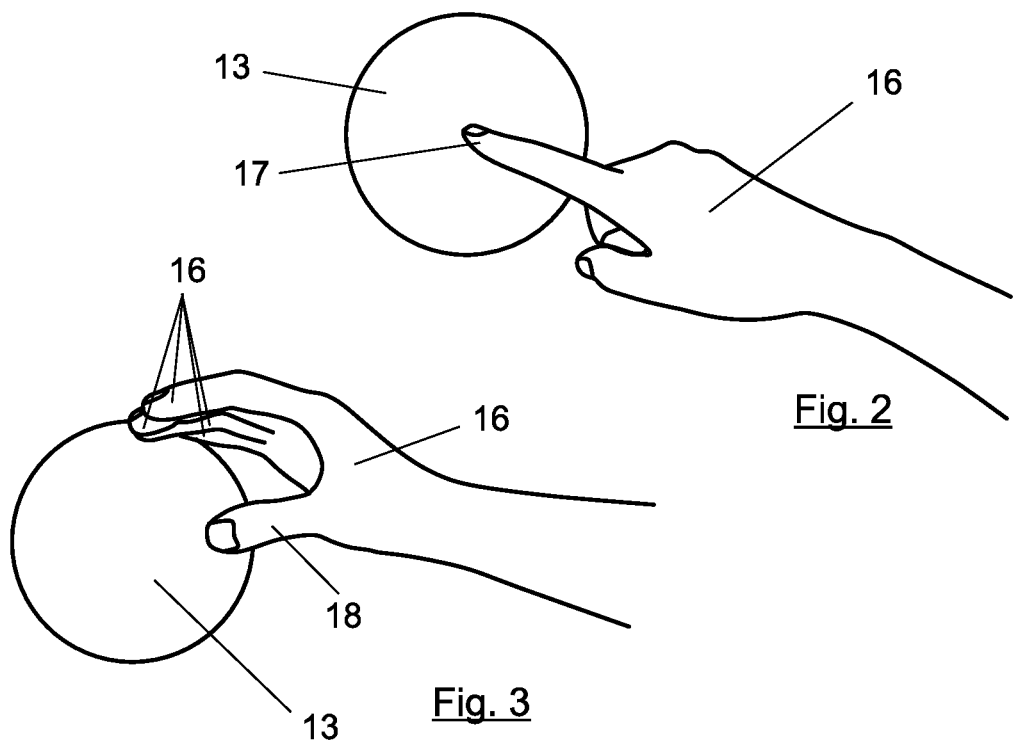
Fig. 2
Fig. 3

METHOD FOR CONTROLLING A LIGHTING SYSTEM SO THAT A LIGHT FOLLOWS MOVEMENT OF A HAND

BACKGROUND AND SUMMARY OF THE INVENTION

Exemplary embodiments of the invention relate to a method for controlling a lighting system in an interior chamber of a vehicle.

Controlling a lighting system in the interior chamber of a vehicle via gestures of a person located in the interior chamber of the vehicle, in particular via movement gestures of this person, is known from the prior art. DE 10 2015 010 421 A1 describes the three-dimensional detection of a vehicle interior chamber, in order to detect and to recognize gestures that are used to activate a control device. In this publication, it is described, among other things, that an interior light can be controlled with such a sensor system. Here, a requirement of the interior light caused by the situation can be determined from movements. Thus, for example when reaching into a map pocket or the glove compartment, this can be illuminated. If a book that a person located inside the vehicle obviously wishes to read is recognized, this can be illuminated. If the display of a mobile or tablet PC is recognized, for example, only the surroundings are illuminated, but not the display itself in order to minimize glare and similar.

DE 10 2016 005 062 A1 describes a device and a method for illuminating the interior chamber of a vehicle in which LED arrays having a plurality of individually controllable light points are suitable for undertaking a targeted and directed illumination, for example by a light cone and a light spot being generated as targeted reading light for a person located in the vehicle.

In relation to the further prior art, in this context, reference can also be made to DE 10 2012 017 276 A1, which shows a method or a device for automatically controlling an illumination unit in the interior chamber of a vehicle. Here, the brightness is controlled depending on an object to be considered in the vehicle and depending on various further parameters.

Exemplary embodiments of the present invention are directed to a method for improved control of an interior chamber lighting system using gestures which enables, in particular, an intuitive and comfortable control of the lighting system.

The method according to the invention for controlling a lighting system in an interior chamber of a vehicle with controllable light sources, which generate at least one light spot or reading light spot with a defined light cone and light spot, is carried out, comparable to the prior art, via the recognition of gestures and a gesture camera. Differently to the prior art, the lighting system is not activated when a corresponding gesture has been recognized, rather the lighting already switched on can be correspondingly controlled. To do so, a light controller is activated between a starting point in time and an end point in time. When the light controller is activated, via a gripping gesture or pointing gesture of a hand in the region of the light cone or light spot, this can be carried along with the hand carrying out the gesture. The light cone or, in particular the light spot that can be perceived better and is generated by the light cone, can thus be "grasped" via a pointing gesture, for example, into the middle of the slight spot or via a gripping gesture in the region of the light spot and can be shifted in the desired manner. For example, from the one side of a back to the neighboring side, from a book to a drink in a drink holder or similar. This is all carried out very intuitively, since only the light spot has to be gripped or pointed to in order to then carry it along with the hand between the starting point in time and the end point in time of the light control, to thus pull the gripped light spot into a new position or to shift it virtually to there with a pointing gesture. This is all exceptionally simple and intuitive in the application. A person using this kind of light control in the interior chamber of the vehicle can thus easily and very comfortably use the light controller without further understanding.

According to a very advantageous development of the method according to the invention, the starting and/or end point in time for activating and deactivating the light controller can be predetermined by a gesture and/or a change of the movement of the hand with the gesture. Thus, the starting point in time can be very easily predetermined by the corresponding gesture being carried out in the region of the light spot, i.e., for example the light spot being "touched" with a finger during the pointing gesture. In a pointing gesture, this would be gripping the light spot. The starting point in time is then predetermined via this gesture and thus the light controller is activated, such that the light spot follows the moving hand. The end point in time can, in turn, be achieved, for example by the hand reversing the gesture and thus displaying to the gesture controller that the light spot has arrived at the desired location and thus the end point in time is predetermined. The same can also be achieved by the movement of the hand by the movement taking place up until then being stopped for a certain period of time, such that, in doing so, virtually the end of the movement and thus the end point in time for the activation of the light controller can be recognized.

Alternatively, or additionally to this, it is also possible that the starting point in time and/or the end point in time is predetermined by a touch of a button or a touch-sensitive surface. In this way, the starting and/or end point in time can also alternatively or additionally be predetermined. For example, a button or a touch-sensitive screen or a different touch-sensitive surface can be touched in order to correspondingly activate the light controller. This would be useful, for example with a two-handed operation, and can very accurately predetermine the points in time for the start and/or the end of the activation of the light controller, such that a very safe and reliable result can be obtained. This kind of controller can thus be combined arbitrarily with the controller described above via the gestures and/or movement speed, such that the starting point in time, for example, can be predetermined in the one manner and the end point in time in the other manner or both points in time, as requested by the operator, in the one or the other manner.

According to a further very advantageous design of the method according to the invention, it can furthermore be provided that, in turn, the starting point in time and/or end point in time is predetermined by a speech control alternatively or additionally to the possibilities already described. Using such a speech control, the starting point in time and/or the end point in time for the activation of the light controller can be predetermined comparably exactly, such as via a button or a touch-sensitive surface. In contrast to this, a second hand is not necessarily required, such that the starting point in time can be triggered, for example by a corresponding speech command. Alternatively, or additionally, this can also be carried out with the end point in time. Here, it is also true that the methods can be combined with each other, for example the starting point in time is predetermined via a speech control and the end point in time via a gesture. It is also conceivable to predetermine each of the points in time as requested by the user via a speech controller, a button or touch-sensitive surface and/or a gesture, such that, in the best case scenario, all possibilities are redundant and are optionally available for the starting point in time and the end point in time.

A further very advantageous aspect of the method according to the invention lies in a display of the beginning and/or the end of the active light control being carried out according to a very favorable development. Such a display of the beginning and/or the end of the active light controller gives feedback to the user as to whether their command or their specification for the starting point in time and/or the end point in time has been reliably recognized. In particular when predetermining the starting point in time and/or the end point in time using the gesture controller or the adaptation of the movement of the hand carrying out the gesture, this plays a role, yet can also be helpful as feedback during the speech control and/or the control of a button or a touch-sensitive surface.

Along with purely displaying the beginning and/or the end of the active light controller, i.e., the reliably recognized predetermined starting point in time or end point in time, according to a very advantageous development of the idea, a display of the active light controller can be carried out for its entire duration. Thus, for the person using the light controller, it is very readily obvious that the light controller is currently active and they can move the light spot or light cone by means of the corresponding gesture into their desired position. This feedback is also helpful, in particular when the movement is carried out very quickly, and the light cone or light spot lags behind the movement slightly, such that it is a comfortable situation for the person using the light controller when the fact that the light controller is active is continuously displayed to them.

Both the display of the beginning and/or the end of the active light controller and the display during the whole duration of the active light controller can now be carried out as a visual display, according to a very favorable design. Such a visual display is conceivable in principle in various ways. Thus, an LED or similar, for example, can be activated in the region of the field of vision of the person using the light controller or can change its color. According to an exceptionally favorable development of this design of the invention, it is, however, here provided that the display is carried out by a variation of the light cone or light spot in terms of brightness, size and/or color temperature. The light cone or light spot itself can, and this constitutes an exceptionally favorable, advantageous and intuitively perceptible possibility, comprise the visual display. The light cone or light spot can correspondingly react to this by brightness, color, size, color and/or color temperature being changed. In doing so, flashing, for example, can be used by raising and lowering the brightness or also switching the light on and off, changing the size, i.e., breathing or billowing of the light spot, or changing the color temperature, for example from cold-white to warm-white or the color to other color tones, in order to intuitively and efficiently display to the person using the light controller that the starting point in time and/or the end point in time, for example, has been predetermined, and/or the light controller is in its active phase.

Alternatively, or additionally, several light sources, which each form an individual light spot, can be used. When using several light spots, a first base illumination with white light can be used and a second additional light spot with colored light can be used. The colored light then obtains its color spectrum from the RGB (red-green-blue) color space.

Additionally, or alternatively to this, according to an advantageous development of the display, it can also be provided that the display is carried out acoustically and/or haptically. The display can be carried out acoustically, for example by the starting point in time and/or the end point in time being displayed by a bleep or similar. Alternative possibilities would be a speech output, for example, or similar. This can also be realized for the duration of the active light controller, by a melody being played for this duration, for example, a sequence of notes sounding or similar. Alternatively, a haptic piece of feedback is also possible, for example by a seat of the person carrying out the gesture correspondingly vibrating, in order to display the starting point in time and/or the end point in time or, in particular, the active light controller, for its entire duration. This acoustic and/or haptic manner of display can be used independently of a visual display or can be combined, in particular, with a visual display, in order to design the display even more efficiently. For example, an acoustic tone for displaying the starting point in time of the active light controller and an acoustic tone for displaying the end point in time of the active light controller would be conceivable. In between this, for the duration during which the light controller is active, the color temperature and/or brightness of the light spot can correspondingly pulse in order to display that the light controller is active. Alternatively, or additionally to the example presented, other variants are of course also conceivable and possible.

Here, various kinds of light sources can be used as light sources, which are able to move the light spot in the desired manner. According to a very advantageous development of the method according to the invention, LED arrays or micro-LED arrays are to be used as light sources. Here, the LED arrays can contain from a few dozen LEDs to many thousands of LEDs. Advantageously, the arrays contain 1024 individually controllable light points. Such elements are commercially available and have been developed as part of a so-called µAFS (AFS=Adaptive Front Lightning System) as LED chips with a size of about 2.5×2.5 cm and 1024 micro-LEDs. These LED chips have been developed, in particular, for the external headlights of vehicle, in order to achieve an active illumination. They are suitable as a result of their high degree of compactness and the high resolution as well as the good controllability, even for the interior illumination of a vehicle and here in particular for a construction, which uses the method according to the invention in one of the design variants described above, since it can very quickly and efficiently realize a light spot following a hand with the gesture and here, in particular, can also realize the visual display, for example by billowing, pulsing brightness or similar, within the light spot.

BRIEF DESCRIPTION OF THE DRAWING FIGURES

Figure 5:
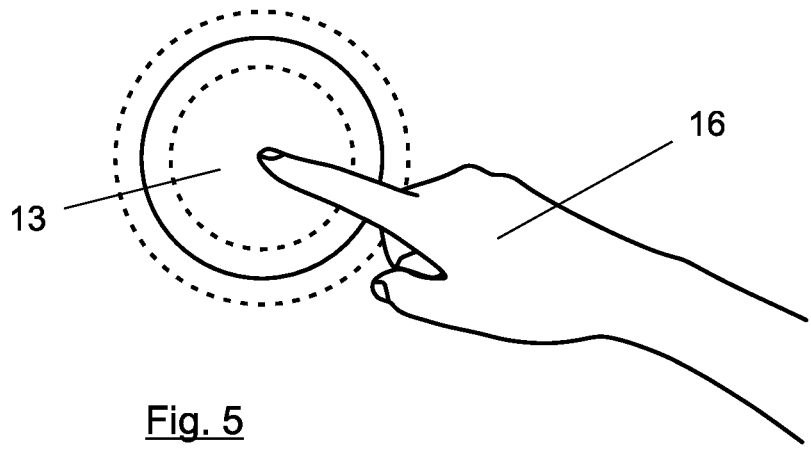

Further advantageous designs of the method according to the invention also emerge from the exemplary embodiment, which is described in more detail below with reference to the figures. Here are shown:

FIG. 1 a schematic depiction of an interior chamber of a vehicle from above;

FIG. 2 a possible pointing gesture in the region of a light spot;

FIG. 3 a possible gripping gesture in the region of a light spot;

FIG. 4 a schematic depiction of the active light controller of the method according to the invention; and FIG. 5 a principle depiction of a visual display through the light spot when the light controller is active.

DETAILED DESCRIPTION

An interior chamber 1 of a vehicle (not depicted in its entirety) can be recognized in the depiction of FIG. 1. The interior chamber 1 of the vehicle consists of a front region having two seats 2, 3 and the back seat region having three seats 4, 5, 6. Various light sources in the form of micro-LED arrays 7 are to be present in the interior chamber 1 of the vehicle. Here, light sources 7 arranged in the region of the rear door handles 8 are present to explain the method according to the invention. Further positions for optional additional light sources would be, for example, front door handles 9 and various positions in the region of an armrest labelled with 10 in the interior chamber 1 of the vehicle. In this region, optional light sources labelled with 11 are indicated in a dashed manner. The interior chamber 1 of the vehicle further has a camera system for recording the interior chamber 1 and for recognizing and evaluating gestures of people in the interior chamber 1 of the vehicle. The camera system can also be referred to as the gesture camera 12.

The light source 7 located in the rear left-hand door handle 8 in the driving direction F can here implement a light cone 14 and a light spot 13 in the longitudinally hatched region outlined with a dot-dashed line, while the light source 7 in the rear door handle 8 on the right in the driving direction F is responsible for the transversely hatched region outlined with a dashed lined. Now, a person wanting to read a book, a map, a magazine, or similar and having activated a reading light to do so, which is correspondingly generated via the light source 7 in the rear, left-hand door handle 8 in the driving direction F, is to sit, for example, on the rear seat 4 in the interior chamber 1 of the vehicle. For this, the light source 7 radiates the light cone 14, which generates the light spot 13 indicated. The person on the seat 4 would now like to shift this light spot 13 from their book, for example, from the one page to the other or to shift it in the region of a central console, for example, labelled with 15, in order to take hold of a drink from a cup holder located there. This can now be carried out by the person located on the seat 4 and (not depicted in more detail) "touching" the light spot 13 using a gesture and thus activating a light controller. In the depictions of FIGS. 2 and 3, exemplary gestures are indicated. In the depiction of FIG. 2, this is a pointing gesture, in which a pointing finger 17 is stretched out on a hand 16 and is directed towards the light spot 13. This gesture is recognized via the gesture camera 12 and the light controller is activated. By shifting the hand 16 or the outstretched pointing finger 17 and the corresponding recording of the movement by the gesture camera 12, the light spot 13 can now follow the hand 16 carrying out the gesture, such that the light spot virtually "touches" by means of the outstretched pointing finger 17 and is shifted into the desired position.

In the depiction of FIG. 3, an alternative gesture is depicted. In this case, the hand carries out a gripping gesture and effectively grips the light spot 13 between the thumb 18 and the further fingers 19. Thus, the light spot 13 can also be "gripped" and correspondingly shifted or "pulled" into the new position. In the depiction of FIG. 4, this is depicted from a starting position, depicted dashed, of the light spot 13 and the hand 16 up to an end position of the hand 16. The light spot 13 is correspondingly followed and thus positioned in the same position at the end point in time in relation to the hand 16 as at the starting point in time, such that the person guiding the hand 16 can move the light spot 13 into the desired new position.

The starting point in time for this light controller, during which the light spot 13 is followed by the hand 16 carrying out the gesture, can now be triggered in various manners. It is particularly simple and efficient to achieve this using a gesture recognized by the gesture camera 13. Thus, if a pointing gesture in terms of FIG. 2 or a gripping gesture in terms of FIG. 3 is made in the region of the light spot 13 or the light cone 14, in doing so, the light controller is then activated and the light spot 13 is correspondingly followed. Alternative possibilities would be, for example, touching a button or a touch-sensitive surface to activate the light controller for following the light spot 13, however this requires a second hand to initiate this starting process. A speech controller, which is received by a microphone 20 installed in the interior chamber 1 and indicated in FIG. 1 and is recognized as the starting point in time for the activation of the light controller, is conceivable. The same applies to the end point in time. In turn, this can be predetermined via the gesture controller by the gesture, for example, being triggered in the region of the light spot 13. Stopping the movement could also suffice as the specification of the end point in time. Here, it is also conceivable, in principle, in addition or alternatively to such a gesture, to in turn use a button or a touch-sensitive surface for predetermining the end point in time, or to predetermine the end point in time using a speech command. Here, the various manners can also be combined with one another, such that the person using the light controller can select from the variants described at their own convenience for the starting point in time and for the end point in time.

Here, it is particularly favorable when there is a corresponding display at least of the starting point in time and the end point in time or also the entire duration when the light controller is active. This feedback to the person using the light controller helps to increase the acceptance and reliability of the system and the positive perception of the system with the person. In particular, the starting and/or end point in time can here be acoustically displayed via an acoustic signal from a speaker 21 indicated. A piece of haptic feedback, for example by a vibration of the seat 4 indicated by a line labelled with 22, is also conceivable. Similarly, it would also be conceivable to emit the feedback via the light cone 14 or the light spot 13 itself, for example by this briefly flashing, changing its light temperature or light color or similar. This is possible both for the end point in time and for the starting point in time. Furthermore, it is possible and, in particular with a visual display via the light spot 13, even useful when, during the entire time for which the light controller is active, it displays this. This can be carried out, for example, by a variation of the brightness, of the size and/or the color temperature or light color of the light spot 13, such that this pulses in terms of its size. In turn, this is schematically depicted in FIG. 4 with the gesture of the hand 16 according to FIG. 2 by the dashed line, which is supposed to indicate the enlargement and shrinking of the light spot 13.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for control a lighting system in an interior of a vehicle, the method comprising:
   generating, by a controllable light source of the vehicle, at least one reading light with a defined light cone and a light spot;
   determining that a light controller activation command is received, wherein the light controller activation command is received from a person located in the interior of the vehicle, and wherein the light controller activation command is a first gesture, a touch of a button, a touch of a touch-sensitive surface, or a command received by a speech controller;
   activating, responsive to determining that the light controller command is received, a light controller of the vehicle;
   recognizing, by a gesture camera of the vehicle, a second gesture of the person located in the interior of the vehicle, wherein the second gesture is a gripping or pointing gesture of the hand in a region of the light cone or light spot; and
   guiding, responsive to recognizing the second gesture, the at least one reading light along with movement of the hand performing the second gesture until the light controller is deactivated,
   wherein the light controller is deactivated responsive to receipt of a light controller deactivation command from the person, wherein the light controller deactivation command is a third gesture, another touch of the button, another touch of the touch-sensitive surface, the movement of the hand with the second gesture stopping for a period of time, or another command received by the speech controller.

2. The method of claim 1, further comprising:
   outputting feedback to the user of the activation and deactivation of the light controller.

3. The method of claim 2, wherein the feedback is output for an entire duration between the activation and deactivation of the light controller.

4. The method of claim 2, wherein the feedback is a visual display.

5. The method of claim 4, wherein the visual display is a variation of the light cone or the light spot in terms of brightness, size, color temperature, or color.

6. The method of claim 2, wherein the feedback is acoustic or haptic feedback.

7. The method of claim 1, wherein the controllable light source comprises light-emitting diode (LED) arrays or micro-LED arrays with individually controllable light points.

* * * * *